(12) United States Patent
Sadri et al.

(10) Patent No.: US 10,942,071 B2
(45) Date of Patent: Mar. 9, 2021

(54) VEHICLE CLOSURE PRESSURE SENSOR

(71) Applicant: Ford Global Technologies, LLC, Dearborn, MI (US)

(72) Inventors: Hossein Jacob Sadri, Novi, MI (US); Steve Juszczyk, Walled Lake, MI (US); Steven Torey, Macomb Township, MI (US); Timothy Parker, Saline, MI (US); Matthew Phillip Solomon, Brownstown, MI (US); Doug Heerema, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 16/368,946

(22) Filed: Mar. 29, 2019

(65) Prior Publication Data

US 2020/0309613 A1 Oct. 1, 2020

(51) Int. Cl.
| | | |
|---|---|---|
| *B62D 65/00* | (2006.01) | |
| *G01L 1/12* | (2006.01) | |
| *B62D 65/06* | (2006.01) | |
| *G01L 1/26* | (2006.01) | |
| *B60J 10/84* | (2016.01) | |

(52) U.S. Cl.
CPC .............. *G01L 1/122* (2013.01); *B60J 10/84* (2016.02); *B62D 65/06* (2013.01); *G01L 1/26* (2013.01)

(58) Field of Classification Search
CPC ......... G01L 1/04; G01L 5/0057; B62D 65/06; Y10T 29/49771; Y10T 29/4978; Y10T 29/49778; Y10T 29/49764; A61B 5/1473; A61B 5/1451; A61B 5/0015; A61B 5/14865; A61B 5/14503; A61B 5/14532; A61B 5/14546; A61B 5/0002
See application file for complete search history.

(56) References Cited

U.S. PATENT DOCUMENTS

| | | | |
|---|---|---|---|
| 10,457,344 B2 * | 10/2019 | Sadri | ................. B23P 19/10 |
| 2018/0143088 A1 | 5/2018 | Sadri et al. | |
| 2018/0155577 A1 | 6/2018 | Sadri et al. | |

FOREIGN PATENT DOCUMENTS

| | | |
|---|---|---|
| CN | 101201274 | 6/2008 |
| CN | 202110009 | 1/2012 |
| FR | 2708100 | 1/1995 |

OTHER PUBLICATIONS

Sensor Products, Inc., Door Seal, Tactilus® product information page, 2019.
Tekscan, Inc., Analyzing Contact Pressure of Automotive Doors, available at URL https://www.azosensors.com/article.aspx?ArticleID=1451.

* cited by examiner

*Primary Examiner* — Brandi N Hopkins
(74) *Attorney, Agent, or Firm* — Burris Law, PLLC

(57) ABSTRACT

A device for measuring a pressure of a vehicle closure member includes a pressure sensitive tip, a base, a plurality of electrical conductors, and a neck. The pressure sensitive tip is configured to output an electronic signal that corresponds to a pressure at the pressure sensitive tip. The electrical conductors electrically couple the pressure sensitive tip to the base. The neck includes an inner layer and an outer layer. The inner layer is disposed about the electrical conductors. The outer layer is disposed about the inner layer. The neck is flexible along a length of the neck.

20 Claims, 4 Drawing Sheets

VEHICLE CLOSURE PRESSURE SENSOR

FIELD

The present disclosure relates to a device for measuring a closing pressure of a vehicle closure.

BACKGROUND

The statements in this section merely provide background information related to the present disclosure and may not constitute prior art.

In vehicle assembly operations, closure members such as doors and trunk lids must be accurately assembled within a door frame, trunk opening, hood opening, or the like. When a closure member is misaligned or the closure member or the frame is out of tolerance or a peripheral seal (e.g., weather stripping) is incorrectly installed, areas around the closure member may exert insufficient or excessive pressure on the peripheral seal. Insufficient pressure on the peripheral seal may result in a water leak or wind noise, vibration and harshness (NVH issues). Excessive pressure on the peripheral seal may result in high effort being required to close the closure member.

In some vehicle configurations, the peripheral seal is hidden by a tortuous path formed by the closure member and the vehicle body. Typical pressure sensors used for measuring the closing pressure of the peripheral seal can be difficult to position in a way that accurately and repeatably detects the closing pressure.

The present disclosure addresses these issues associated with traditional vehicle closure pressure sensing devices.

SUMMARY

This section provides a general summary of the disclosure and is not a comprehensive disclosure of its full scope or all of its features.

In one form, a device for measuring a pressure of a vehicle closure member includes a pressure sensitive tip, a base, a plurality of electrical conductors, and a neck. The pressure sensitive tip is configured to output an electronic signal that corresponds to a pressure at the pressure sensitive tip. The electrical conductors electrically couple the pressure sensitive tip to the base. The neck includes an inner layer and an outer layer. The inner layer is disposed about the electrical conductors. The outer layer is disposed about the inner layer. The neck is flexible along a length of the neck. In a variety of alternate forms of the present disclosure: the outer layer includes a permanent magnet; the inner layer is a magnetically shielding material; the inner layer is a metallic cloth; the neck includes a sheath portion and stop portion, the stop portion is proximate to the pressure sensitive tip and extends radially outward from the sheath portion; the device further includes a handle coupled to the base; the base includes a visual output configured to visually indicate to an operator a pressure detected by the pressure sensitive tip; the visual output includes a light, a digital display, or an analogue display; the device further including at least one button or switch coupled to the base or the handle; the device further including a cable coupled to the base and extending therefrom, the cable is configured to electrically couple the base to an external system to transmit data, power, or both data and power between the base and the external system; the device further includes a wireless transmitter coupled to the base and configured to communicate with an external system to transmit data between the base and the external system; the neck has a stiffness configured to support the pressure sensitive tip above the base; the neck the neck is a resilient material configured to conform to a tortuous shape when the vehicle closure member is in a closed position and to return to an original shape when released from the vehicle closure member; the neck is configured to twist about a central axis of the neck; the first and second layers have a tubular shape; the outer layer includes a plurality of segments; the inner layer is continuous along the length of the neck; the neck is flexible along an entire length of the neck.

In another form, a device for measuring a pressure of a vehicle closure member includes a pressure sensor, a base, a plurality of electrical conductors, and a sheath. The pressure sensor is configured to output an electronic signal that corresponds to a pressure detected by the pressure sensor. The electrical conductors electrically couple the pressure sensor to the base. A proximal end of the sheath is coupled to the base. A distal end of the sheath is coupled to the pressure sensor. The sheath includes an inner layer and an outer layer disposed about the inner layer. The inner layer is disposed about the electrical conductors. The sheath has a resilience that biases the sheath toward an initial shape while permitting the sheath to flex about a tortuous shape. In a variety of alternate forms of the present disclosure: the outer layer includes a permanently magnetized material and the inner layer is metallic.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
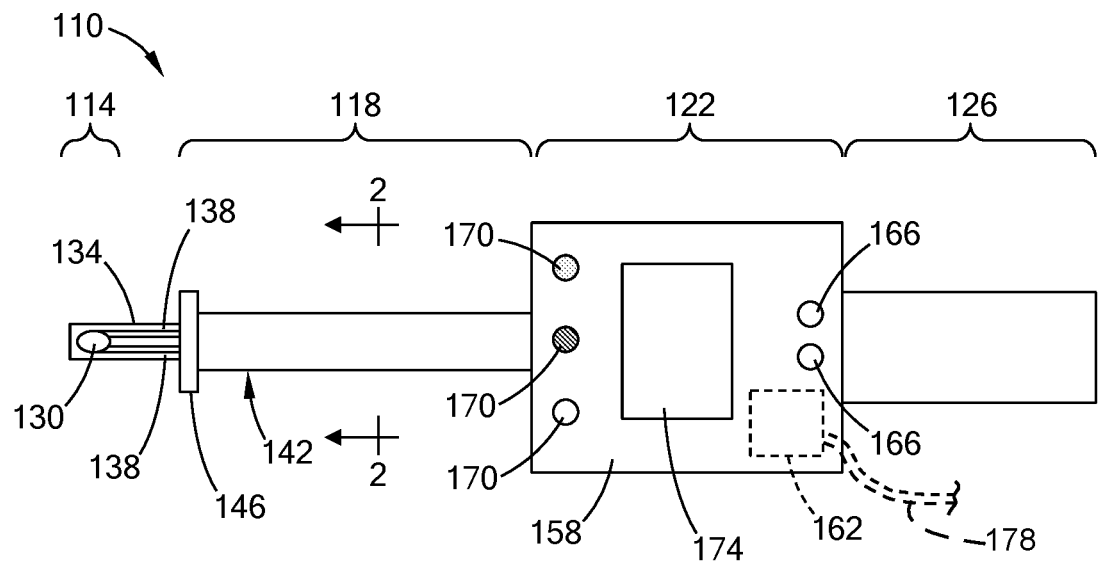
FIG. 1 is a plan view of an example vehicle closure pressure sensor in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring to FIG. 1, a vehicle closure pressure sensor device 110 is illustrated. The device 110 includes a pressure sensitive tip 114, a neck 118, a base 122, and a handle 126. The tip 114 includes a thin, flat pressure sensing element 130. In the example provided, the pressure sensing element 130 is encased in a thin, flexible plastic film 134 and has two flexible electrical conductors 138 extending from the tip 114. The plastic film 134 is electrically insulating. In the example provided, the electrical conductors 138 are flat, metal or electrically conductive polymer strips or traces that are spaced apart within the plastic film 134, though other configurations can be used. The tip 114 is illustrated as a circular shape but can be any suitable shape. The pressure sensing element 130 can be any suitable type of pressure sensing element such as a single point force sensor (e.g., a piezoresitive sensor or a shunt mode sensor) or can be configured to sense a distribution of pressures across an area of the tip 114.

Figure 5:
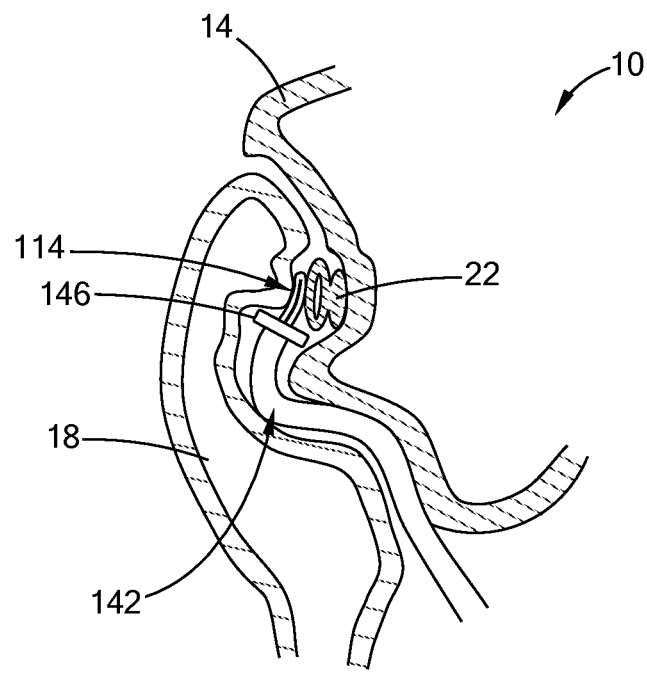
FIG. 5 is a cross-sectional view of the vehicle and vehicle closure pressure sensor of FIG. 4, illustrating the door in a closed position.

The conductors 138 and plastic film 134 extend axially through the neck 118. The neck 118 includes a sheath portion 142 and a stop portion 146. A proximal end of the sheath portion 142 is fixedly coupled to the base 122. The sheath portion 142 extends axially from the base 122 to a distal end of the sheath portion 142 spaced apart from the base 122. The sheath portion 142 is flexible such that it can be bent into a tortuous shape (e.g., as shown in FIG. 5) and can also twist. The stop portion 146 is fixedly coupled to the distal end of the sheath portion 142 between the sheath portion 142 and the tip 114. The stop portion 146 extends radially outward of the sheath portion 142 and the tip 114.

Figure 2:
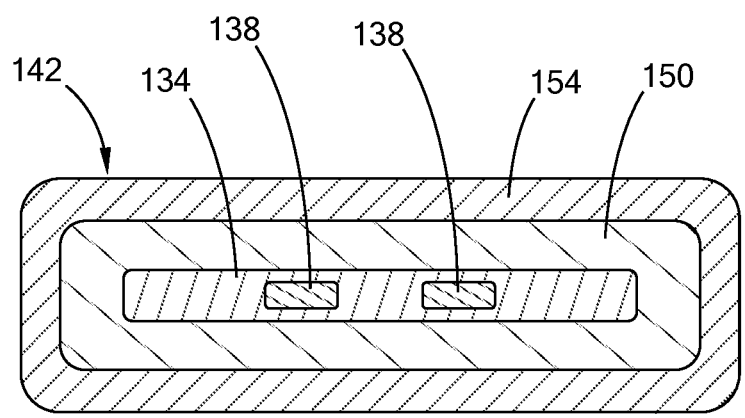
FIG. 2 is a cross-sectional view of the vehicle closure pressure sensor of FIG. 1, taken along line 2-2 shown in FIG. 1.

With additional reference to FIG. 2, the sheath portion 142 includes an inner layer 150 and an outer layer 154 that form a layered tube. In the example provided, the sheath portion 142 has a generally rectangular cross-section though other configurations can be used, such as a round tubular shape. The inner layer 150 wraps completely around the plastic film 134 to fully encircle the conductors 138 in a tubular manner. The inner layer 150 is flexible such that it can be bent into a tortuous shape (e.g., as shown in FIG. 5) and is configured to protect the conductors 138 within the plastic film 134.

In the example provided, the inner layer 150 is a thin metallic cloth or metallic sheet formed into a tube shape about the conductors 138. In the example provided, the inner layer 150 is a magnetically shielding material, such as metal for example, to shield the conductors 138 from electromagnetic interference and protect data transfer through the conductors 138. The inner layer 150 extends axially along the entire length of the sheath portion 142.

Figure 3:
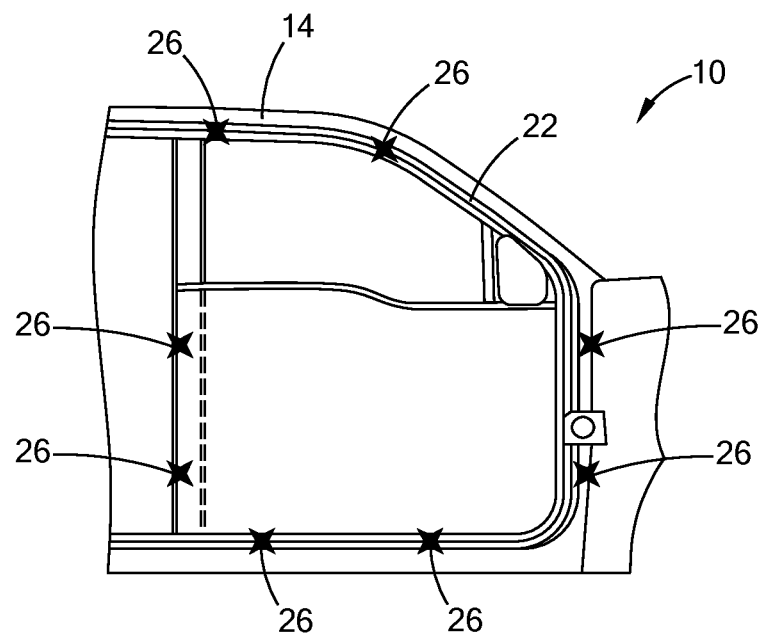
FIG. 3 is a side view of a vehicle illustrating example test locations along a door frame in accordance with the teachings of the present disclosure.
Figure 4:
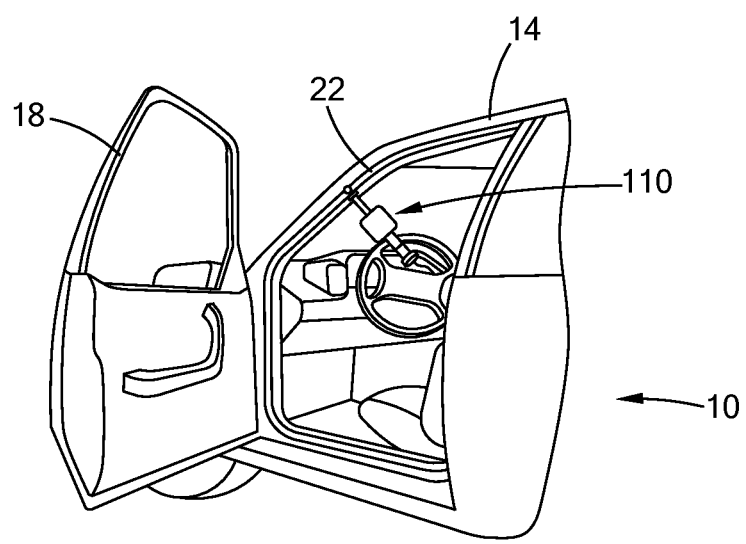
FIG. 4 is a perspective view of the vehicle of FIG. 3 illustrating the vehicle closure pressure sensor of FIG. 1 positioned along the door frame with a door in an open position.

The outer layer 154 wraps completely around the inner layer 150 to fully encircle the inner layer 150 in a tubular manner. The outer layer 154 is flexible but has a stiffness sufficient to support the weight of the tip 114 above the base 122 when the tip 114 is held up above the base 122 (as shown in FIG. 4) without the neck 118 bending under the weight of the tip 114. The outer layer 154 is a resilient material such that it can be bent into a tortuous shape (e.g., as shown in FIG. 5) and will automatically return to its original shape (e.g., straight as shown in FIG. 1) upon being released. In the example provided, the outer layer 154 is a thin, magnetized sheet that forms a tube shape about the inner layer 150. In the example provided, the outer layer is a permanent magnet. The inner layer 150 is configured to shield the conductors 138 from the magnetic field of the outer layer 154. The outer layer 154 is configured to attract the neck 118 to ferrometallic components of a vehicle 10 (FIG. 3) such as a door frame 14 (FIG. 3) or door 18 (FIG. 4). The relatively stable magnetic field of the outer layer 154 is also configured to help shield the conductors 138 from external electromagnetic interference. The outer layer 154 is also resistant to oils and chemicals.

In an alternative construction, not specifically shown, the outer layer 154 can be a material that is not permanently magnetized, but still has a stiffness and resilience that supports the tip 114 above the base 122 while permitting the neck 118 to bend in a tortuous shape and return to its original shape upon being released. In this alternative construction, the inner layer 150 can be a different type of material other than a metallic cloth, such as a flexible plastic, rubber, or other type of cloth (e.g., cotton or Kevlar).

Returning to the example provided, the base 122 includes a housing 158, a control module 162, one or more inputs (e.g., buttons 166) and one or more indicators (e.g., indicator lights 170 and/or display 174). The control module 162 is disposed within the housing 158 and is coupled to the conductors 138 to for electrical communication therewith to receive signals from the tip 114 indicative of the pressure at the tip 114. In the example provided, the device 110 is powered by a battery (not specifically shown) that is disposed within the housing 158 and connected to the control module 162. In the example provided, two buttons 166 are illustrated, though more or fewer can be included. While the buttons 166 are illustrated on the same side of the base 122 as the indicators, the buttons 166 can be located in any suitable location on the base 122 or off the base 122, such as on the handle 126 for example. The buttons are connected to the control module 162 and are configured to permit an operator to operate the sensor using the buttons 166. While buttons 166 are shown and described herein, the inputs can be other types of inputs, such as toggle switches or plunger switches for example. In an alternative construction, not shown, the display 174 can be a touch screen and the function of the buttons 166 can be replaced with features on the touch screen.

The control module 162 is configured to receive signals from the conductors 138, interpret those signals and output to the indicator lights 170 and/or display 174 to indicate a pressure reading at the tip 114. The indicator lights 170 and display 174 are connected to the control module and configured to indicate a status of the device. For example, the display 174 can show a pressure or force value indicative of the pressure or force at the tip 114. The display 174 can be analogue or digital and can show a number and/or a graphical interpretation of the pressure or force. In the example provided, the control module 162 can be configured to light one of the indicator lights 170 if the pressure/force is above an acceptable pressure/force upper limit, to light a different one of the indicator lights 170 if the pressure/force is below an acceptable pressure/force lower limit, and to light a third one of the indicator lights 170 if the pressure/force is within acceptable limits. The acceptable pressure/force limits can be stored on the control module. Thus, an operator can quickly assess the pressure/force at the tip 114. While not specifically shown, the indicator can alternatively or additionally include a speaker for providing an audible indication.

The handle 126 is fixedly coupled to a side of the base 122 that is opposite the neck 118. The handle 126 is configured to permit an operator to hold the device 110. While not specifically shown, one or more of the buttons 166 can be located on the handle 126 instead of, or in addition to buttons being located on the base 122.

The control module 162 can include a wireless transmitter configured to transmit data (e.g., pressure/force data) from the device to an external system such as an external computer or database. In one alternative construction, a wire (e.g., cable 178 shown in dashed lines in FIG. 1) can be coupled to the control module 162 and extend from the base 122 or the handle 126 to connect the device 110 to the external system and/or to provide power to the device 110. In another alternative construction, not shown, the base 122 or handle 126 can include a device port, such as a Universal Serial Bus (USB) port or similar data port. An output device (e.g., USB flash drive; not shown) can be plugged into the device port (not shown) so that data can be downloaded from the device 110 to the output device (not shown).

The device 110 can be used as described in U.S. patent application Ser. No. 15/356,150 (U.S. Publication Number 2018/0143088), which is commonly owned with the present application. The entire disclosure of U.S. patent application Ser. No. 15/356,150 is incorporated herein by reference. In general, and with reference to FIGS. 3 and 4, the device 110 can be used to detect a closing pressure of a vehicle closure such as the door 18 with the vehicle door frame 14. The device can detect the pressure at a seal 22 (e.g., weather stripping) disposed between the door 18 and door frame 14 such as along a perimeter of the door frame 14. While specific test locations 26 along the seal 22 are illustrated in FIG. 3, the device can be used at any location along the seal 22.

Figure 6:
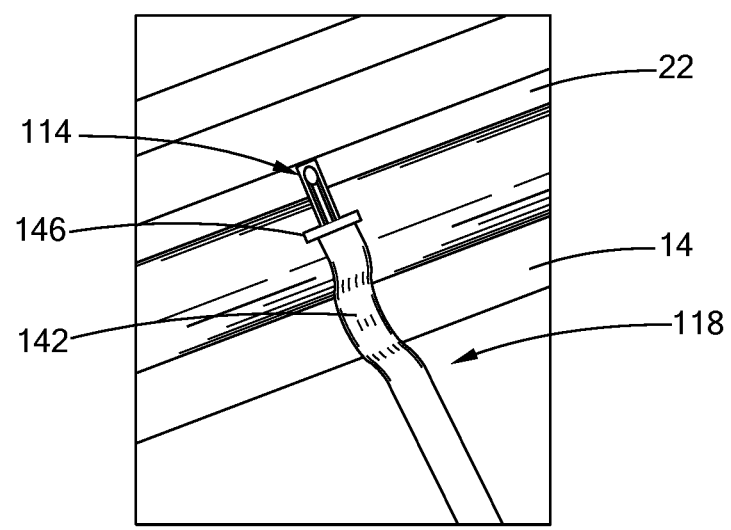
FIG. 6 is a perspective view of the vehicle closure pressure sensor and door frame of FIG. 5, with the door removed from view.

With specific reference to FIG. 4, an operator (not shown) within the vehicle 10 can hold the handle 126 of the device 110 and position the tip 114 in the desired location along the seal 22. The magnetic field of the outer layer 154 of the neck 118 can hold the neck 118 against the door frame 14 to inhibit unintentional movement of the tip 114 out of alignment. The door 18 can then be closed. FIG. 5 illustrates a cross-section of the closed door 18 with the tip 114 disposed between the seal 22 and the door 18 and the neck 118 flexed about a tortuous path between the door 18 and the door frame 14. In the example provided, the neck 118 bends in multiple different directions. This tortuous path is also shown from a side perspective view of FIG. 6, in which the door 18 is not shown for clarity.

The flexibility of the neck 118 also permits variability in the exact angle and twist of the base 122 and handle 126 relative to the door frame 14. Thus, repeatability and accuracy of measurements is maintained despite different holding positions by different operators. The stop portion 146 is configured to be blocked by a portion of the door 18, the door frame 14, or the seal 22 in order to position the tip 114 appropriately on the seal 22. Thus, the stop portion 146 inhibits the tip 114 from moving past the seal 22.

With the device 110 positioned on the seal 22, the operator can push one of the buttons 166 to operate the device 110 to take a pressure measurement. After a measurement is taken, the door 18 is opened and the neck returns to its original (e.g., straight) shape. The operator can then move the device 110 to the next location to be tested.

Figure 7:
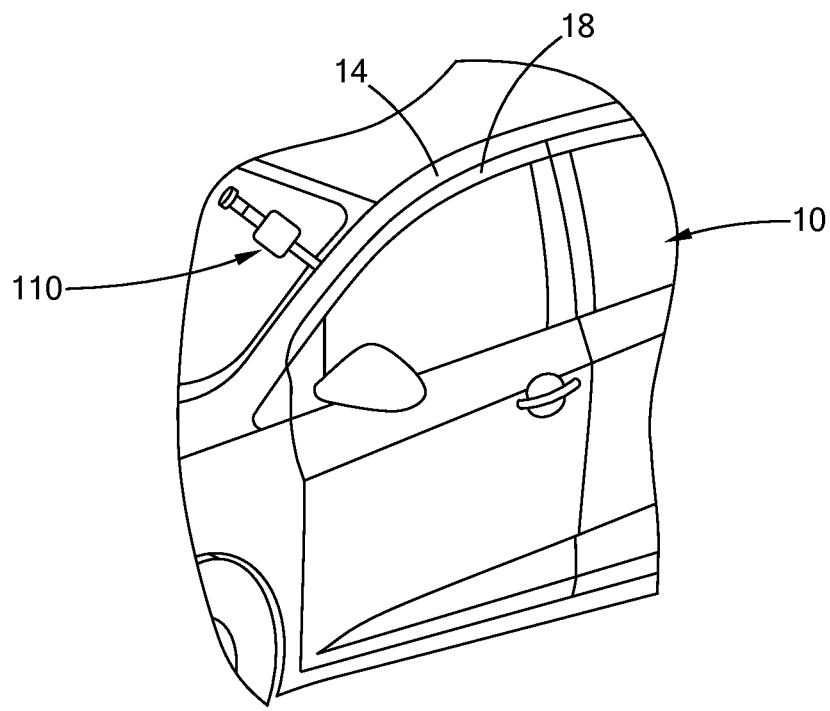
FIG. 7 is a perspective view of the vehicle closure pressure sensor of FIG. 1 in an alternative measuring position, in accordance with the teachings of the present disclosure.

Referring to FIG. 7, the device 110 can alternatively be held outside the vehicle 10 so that the tip 114 is aligned on the seal 22.

Figure 8:
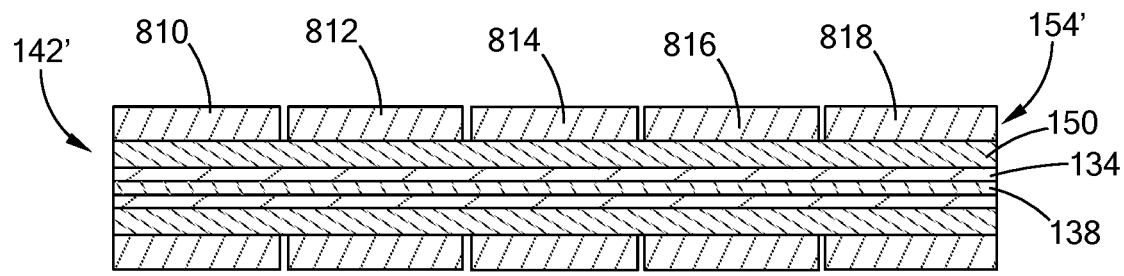
FIG. 8 is a cross-sectional view of a portion of a vehicle closure pressure sensor of a second construction in accordance with the teachings of the present disclosure.

Referring to FIG. 8, a sheath portion 142' of a second construction illustrated. The sheath portion 142' is similar to the sheath portion 142 (FIGS. 1, 2, and 4-7), except as otherwise shown or described herein. Similar features are denoted with similar references numbers or similar but primed reference numbers. Instead of a single, continuous outer layer, the outer layer 154' is segmented into a plurality of segments (e.g., segments 810, 812, 814, 816, 818). The segments 810, 812, 814, 816, 818 can be completely separated as shown or can include thin connections (not shown) therebetween to permit greater flexibility. The segments 810, 812, 814, 816, 818 can be individually flexible. Alternatively, the segments 810, 812, 814, 816, 818 can each be more rigid, while the overall flexibility of the sheath portion 142' is achieved by the segmentation.

Figure 9:
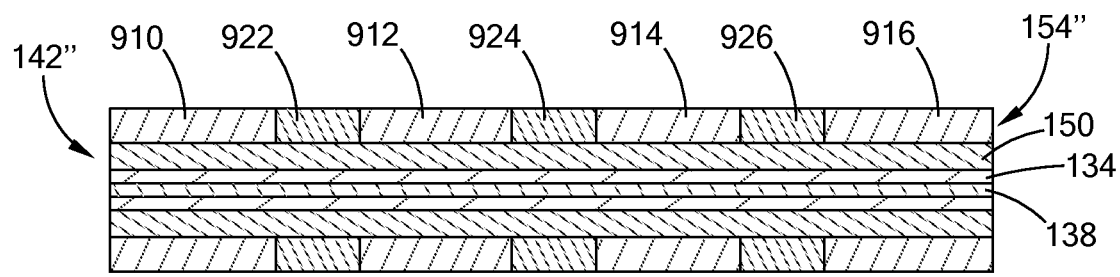
FIG. 9 is a cross-sectional view of a portion of a vehicle closure pressure sensor of a third construction in accordance with the teachings of the present disclosure.

Referring to FIG. 9, a sheath portion 142" of a third construction is illustrated. The sheath portion 142" is similar to the sheath portion 142 (FIGS. 1, 2, and 4-7) and the sheath portion 142' (FIG. 8), except as otherwise shown or described herein. Similar features are denoted with similar references numbers or similar but double primed reference numbers. In this example, the outer layer 154" is segmented into a plurality of segments (e.g., first segments 910, 912, 914, 916 and second segments 922, 924, 926). A corresponding one of the second segments 922, 924, 926 is axially between adjacent ones of the first segments 910, 912, 914, 916. The first segments 910, 912, 914, 916 can be permanently magnetized similar to the outer layer 154 and the segments 810, 812, 814, 816, 818. The second segments 922, 924, 926 are a resilient material such as rubber for example. The first segments 910, 912, 914, 916 can be individually flexible or each can be more rigid, while the overall flexibility of the sheath portion 142" is achieved by the segmentation and second segments 922, 924, 926.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A device for measuring a pressure of a vehicle closure member, the device comprising:
   a pressure sensitive tip configured to output an electronic signal that corresponds to a pressure at the pressure sensitive tip;
   a base;
   a plurality of electrical conductors electrically coupling the pressure sensitive tip to the base; and
   a neck including an inner layer and an outer layer, the inner layer disposed about the electrical conductors, the outer layer disposed about the inner layer, the neck being flexible along a length of the neck.

2. The device according to claim 1, wherein the outer layer includes a permanent magnet.

3. The device according to claim 2, wherein the inner layer is a magnetically shielding material.

4. The device according to claim 3, wherein the inner layer is a metallic cloth.

5. The device according to claim 1, wherein the neck includes a sheath portion and stop portion, the stop portion being proximate to the pressure sensitive tip and extending radially outward from the sheath portion.

6. The device according to claim 1, further comprising a handle coupled to the base.

7. The device according to claim 1, wherein the base includes a visual output configured to visually indicate to an operator a pressure detected by the pressure sensitive tip.

8. The device according to claim 7, wherein the visual output includes a light, a digital display, or an analogue display.

9. The device according to claim 1, further comprising at least one button or switch coupled to the base or the handle.

10. The device according to claim 1, further comprising a cable coupled to the base and extending therefrom, the cable being configured to electrically couple the base to an external system to transmit data, power, or data and power between the base and the external system.

11. The device according to claim 1, further comprising a wireless transmitter coupled to the base and configured to communicate with an external system to transmit data between the base and the external system.

12. The device according to claim 1, wherein the neck has a stiffness configured to support the pressure sensitive tip above the base.

13. The device according to claim 12, wherein the neck is a resilient material configured to conform to a tortuous shape when the vehicle closure member is in a closed position and to return to an original shape when released from the vehicle closure member.

14. The device according to claim 1, wherein the neck is configured to twist about a central axis of the neck.

15. The device according to claim 1, wherein the inner and outer layers have a tubular shape.

16. The device according to claim 1, wherein the outer layer includes a plurality of segments.

17. The device according to claim 16, wherein the inner layer is continuous along the length of the neck.

18. The device according to claim 1, wherein the neck is flexible along an entire length of the neck.

19. A device for measuring a pressure of a vehicle closure member, the device comprising:
   a pressure sensor configured to output an electronic signal that corresponds to a pressure detected by the pressure sensor;
   a base;
   a plurality of electrical conductors electrically coupling the pressure sensor to the base; and
   a sheath, a proximal end of the sheath coupled to the base, a distal end of the sheath coupled to the pressure sensor, the sheath including an inner layer and an outer layer disposed about the inner layer, the inner layer being disposed about the electrical conductors, the sheath having a resilience that biases the sheath toward an initial shape while permitting the sheath to flex about a tortuous shape.

20. The device according to claim 19, wherein the outer layer includes a permanently magnetized material and the inner layer is metallic.

* * * * *